(12) United States Patent
Tiberghien et al.

(10) Patent No.: US 8,251,407 B2
(45) Date of Patent: Aug. 28, 2012

(54) FEMALE COUPLING ELEMENT AND A QUICK COUPLING INCORPORATING SUCH AN ELEMENT

(75) Inventors: Alain-Christophe Tiberghien, Sevrier (FR); Olivier Pastore, Ugine (FR)

(73) Assignee: Staubli Faverges, Faverges (FR)

( * ) Notice: Subject to any disclaimer, the term of this patent is extended or adjusted under 35 U.S.C. 154(b) by 104 days.

(21) Appl. No.: 12/840,603

(22) Filed: Jul. 21, 2010

(65) Prior Publication Data
US 2011/0018258 A1    Jan. 27, 2011

(30) Foreign Application Priority Data
Jul. 23, 2009 (FR) ...................... 09 55159

(51) Int. Cl.
  *F16L 37/18* (2006.01)
(52) U.S. Cl. ........................ 285/316; 285/322
(58) Field of Classification Search .................. 285/316, 285/315, 314, 308, 277, 276, 322
See application file for complete search history.

(56) References Cited

U.S. PATENT DOCUMENTS

| | | | | |
|---|---|---|---|---|
| 747,412 | A * | 12/1903 | Getz ............................. | 285/314 |
| 1,360,588 | A | 11/1920 | Sanderson | |
| 2,803,473 | A * | 8/1957 | Hohmann ....................... | 285/322 |
| 4,195,812 | A * | 4/1980 | Norcross ....................... | 285/322 |
| 5,658,018 | A * | 8/1997 | Hjertholm ....................... | 285/315 |
| 6,557,904 | B2 * | 5/2003 | Naito ............................ | 285/316 |
| 7,309,083 | B2 * | 12/2007 | Tiberghien et al. ............ | 285/316 |
| 7,318,609 | B2 * | 1/2008 | Naito et al. .................... | 285/316 |
| 7,431,346 | B2 * | 10/2008 | Frost et al. ..................... | 285/316 |
| 7,766,393 | B2 * | 8/2010 | Tiberghien et al. ............ | 285/316 |
| 7,770,940 | B2 * | 8/2010 | Binder et al. .................. | 285/316 |
| 7,938,456 | B2 * | 5/2011 | Chambaud et al. ............ | 285/316 |

FOREIGN PATENT DOCUMENTS

| | | |
|---|---|---|
| EP | 1531297 A1 | 8/2005 |
| EP | 1561991 A1 | 8/2005 |
| FR | 2622671 A1 | 5/1989 |

OTHER PUBLICATIONS

International Search Report for FR0955159.

* cited by examiner

*Primary Examiner* — David E Bochna (57) ABSTRACT

The female quick coupling element is fitted with at least one locking member (40) movable in a housing (27) between a first position in which a fraction (46) of the locking member projects out from the housing (27) and a second position in which the fraction (46) of the locking member is disengaged from a groove in a male element endpiece (11) engaged in the female element. A control ring that is slidable relative to the body of the female element parallel to its central longitudinal axis ($X_A$-$X'_A$) is suitable for moving the locking member between its first and second positions. The locking member (40) is provided with at least one surface (42, 43) in the form of a portion of a sphere. The locking member moves between its first and second positions by pivoting about a fixed axis passing through the center of curvature ($C_{40}$) of the surface (42, 43) in the form of a portion of a sphere of the locking member (40) and perpendicular to the central longitudinal axis ($X_A$-$X'_A$) of the female element.

11 Claims, 6 Drawing Sheets

FEMALE COUPLING ELEMENT AND A QUICK COUPLING INCORPORATING SUCH AN ELEMENT

BACKGROUND OF THE INVENTION

1. Field of the Invention

The invention relates to a female quick coupling element and to a quick coupling suitable for use in releasably joining together two pipes of fluid under pressure, and including such a female element, amongst other things.

In the field of releasably joining together pipes conveying a fluid under pressure, it is known to use a female coupling element that includes control means for locking a male element in a configuration in which it is engaged in the female element, i.e. in a configuration connecting together pipes having the male and female elements constituting respective end portions thereof.

BRIEF DESCRIPTION OF THE RELATED ART

EP-A-1 561 991 discloses using locking balls mounted in a female coupling element and designed to be engaged selectively in an outer peripheral groove of a male endpiece. The balls may mark or peen the outside surface of a male endpiece inserted into the female element.

EP-A-1 531 297 also discloses using fingers that are movable in translation parallel to an axis that is oblique relative to the axis along which the male element is engaged in the female element. This reduces the risk of the locking fingers peening the male endpiece(s) with which the female element co-operates. Nevertheless, given the sloping nature of the movement axes of the locking fingers, radial space needs to be provided between a tab of each of those fingers and the radially inner surface of a control ring in order to receive the fingers, which face projects radially relative to the body of the female element. The radial size of the coupling is increased by this radial clearance. This radial size also depends on the contact area between the locking finger and the endpiece of a male element engaged in the female element in a direction that is tangential to the locking fingers.

SUMMARY OF THE INVENTION

The invention proposes a novel female quick coupling element of radial size that is limited or even reduced compared with those of the prior art, while increasing the robustness of its locking member(s) and reducing the risk of peening between the contacting surfaces of elements that move relative to one another.

To this end, the invention relates to a female quick coupling element for releasably joining together pipes of fluid under pressure, the female element being suitable for receiving an endpiece of a male coupling element engaged therein along a longitudinal axis of said female element, the female element being fitted with at least one locking member movable in a housing formed in a body of the female element between a first position in which a fraction of the locking member projects out from the housing in a configuration in which it can be engaged in a peripheral groove of a male element endpiece engaged in the female element, and a second position in which the fraction of the locking member is disengaged from the groove of a male element endpiece in the female element, while a control ring mounted to slide relative to the body of the female element parallel to a longitudinal axis of the female element is suitable for moving the locking member between its first and second positions. This female element is characterized in that the locking member is provided with at least one surface in the form of a portion of a sphere, and in that the movement of the locking member between its first and second positions takes place by pivoting about an axis that is stationary relative to the body of the female element, passing through the center of curvature of the surface in the form of a portion of a sphere of the locking member and perpendicular to a longitudinal axis of the female element.

By means of the invention, the movement of the locking member between its first and second positions takes place over a stroke that is curved, thereby giving rise to radial movement that is smaller than when using a locking finger that moves in translation along an inclined direction. This makes the female element more compact, in particular in a radial direction relative to its central longitudinal axis along which the male endpiece is engaged.

According to aspects of the invention that are advantageous but not essential, such a female coupling element may incorporate one or more of the following characteristics taken in any technically feasible combination:

- The housing is provided with at least one guide surface for guiding the locking member during its movement between its first and second positions, said guide surface being in the form of a portion of a sphere having its center of curvature coinciding with the center of curvature of the surface in the form of a portion of a sphere of the locking member when the locking member is in its configuration mounted in the housing.
- The locking member is provided with two concentric surfaces in the form of portions of a sphere respectively defining portions of two faces of the locking member.
- Return means are provided on the control ring for applying a resilient return force urging the locking member towards one of its first and second positions.
- The female coupling element is fitted with two locking members each movable in a housing formed in the body of the female element, and the two locking members and the two housings are disposed symmetrically on either side of the longitudinal axis of the female coupling element.
- The female coupling element is fitted with at least two locking members and the surfaces in the form of a portion of a sphere of all of the locking members have a common center of curvature.
- The fraction of the locking member that projects from the housing in the first position of the locking member has a surface in the form of a section of a truncated cone suitable for coming into surface-on-surface contact against a frustoconical edge of a groove of an endpiece of a male element engaged in the female element. Under such circumstances, a straight line passing through the geometrical center of the surface in the form of a truncated cone and perpendicular to said surface passes through the center of curvature of the surface in the form of a portion of a sphere of the locking member.
- The surface in the form of a section of a truncated cone extends around the longitudinal axis of the female element over an angular sector having an angle at the apex with a value lying in the range 90° to 150°, and preferably of the order of 120°.
- A plane perpendicular to the longitudinal axis of the female element and containing the center of curvature of the surface in the form of a portion of a sphere of a locking member intersects said locking member in its first and second positions.

The invention also provides a quick coupling for releasably joining together pipes for fluid under pressure, the coupling comprising male and female elements suitable for engaging one in the other. The coupling is characterized in that the female element is as specified above.

The invention can be better understood and other advantages thereof appear more clearly in the light of the following description of five embodiments of a female coupling element and of a coupling in accordance with the principle thereof, given purely by way of example and made with reference to the accompanying drawings, in which:

DESCRIPTION OF THE PREFERRED EMBODIMENTS

The quick coupling R shown in FIGS. 1 to 8 comprises a female element A and a male element or endpiece B that are designed to engage one in the other along the direction of an axis X-X', which in practice is a longitudinal axis common to the elements A and B.

By convention, it is considered that the front portion of an element A or B is the portion of that element that faces towards the other element while they are being connected together.

The rear portion of the female element A is in fluid flow connection with a first pipe $C_1$, itself connected to a source of fluid under pressure (not shown). The rear portion of the male element B is connected to a second pipe $C_2$, itself connected to a member for using or storing the fluid coming from the above-mentioned source.

Figure 1:
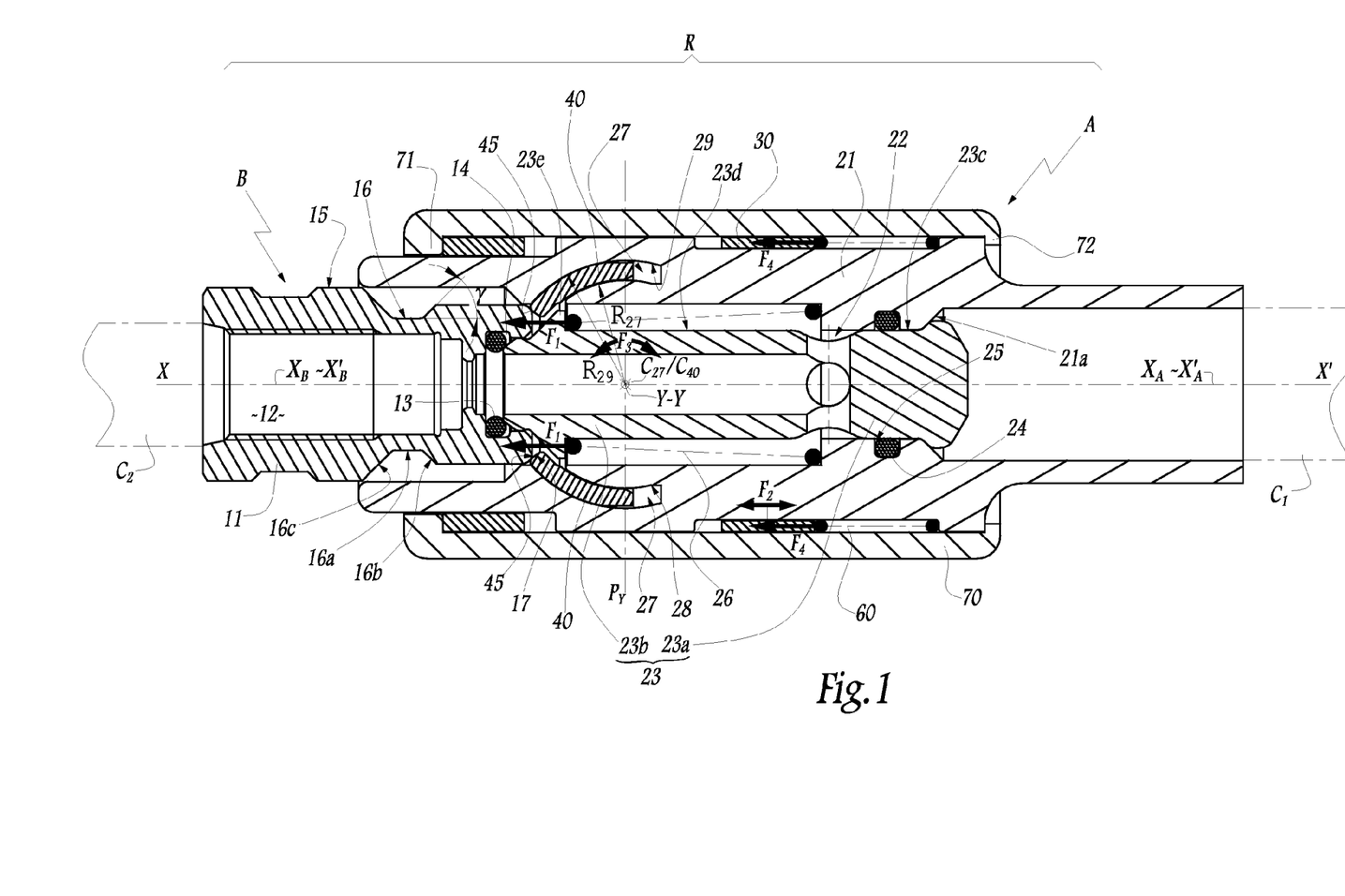
FIG. 1 is an axial section of a coupling in accordance with the invention incorporating a female element in accordance with the invention, the male element being shown approaching, while it is being inserted into the female element.

The male element B comprises a tubular body 11 having the pipe $C_2$ connected thereto and defining a flow channel 12 for fluid under pressure. This channel may constitute a housing for a check valve (not shown). An O-ring 13 is mounted in an internal peripheral groove 14 of the body 11.

The element B is a body of revolution about an axis $X_B$-$X'_B$ that coincides with the axis X-X' when this element is engaged in the female element A.

On its outside radial surface 15, the body 11 is provided with a peripheral groove 16 presenting circular symmetry, of profile defined by a bottom 16a that is flat and two sides 16b and 16c that diverge away from the bottom 16a. Thus, the bottom 16a is cylindrical on a circular base, while the sides 16b and 16c are frustoconical.

The female element A comprises a tubular body 21 of revolution about an axis $X_A$-$X'_A$ that likewise coincides with the axis X-X' when engaged with the male element B. The pipe $C_1$ is connected to the rear portion of the body 21. The body defines a central channel 22 in which a valve 23 is located that is movable parallel to the axis $X_A$-$X'_A$, which is a central longitudinal axis of the element A.

The valve 23 comprises a solid portion 23a and a hollow portion 23b. The portion 23a has an outside surface 23c that is cylindrical and conical for coming into bearing contact against a seat 21a formed by the body 21. An O-ring 24 is installed in an internal radial groove 25 in the body 21 and is designed to provide sealing relative to the surface 23c or relative to the outside radial surface 23d of the portion 23b.

A spring 26 exerts a resilient force $F_1$ on a collar 23e of the valve 23 tending to press the surface 23c of the portion 23a against the seat 21a, i.e. to close the female element A.

A control ring 30 is mounted around the body 21, being movable in translation relative thereto parallel to the axis $X_A$-$X'_A$, and represented by double-headed arrow $F_2$ in FIG. 1. The control ring 30 is prevented from turning relative to the body 21.

The control ring 30 controls two locking members or "fingers" 40 that are identical and that are received in two housings 27 formed in the body 21 in a symmetrical arrangement on either side of the axis $X_A$-$X'_A$.

Figure 8:
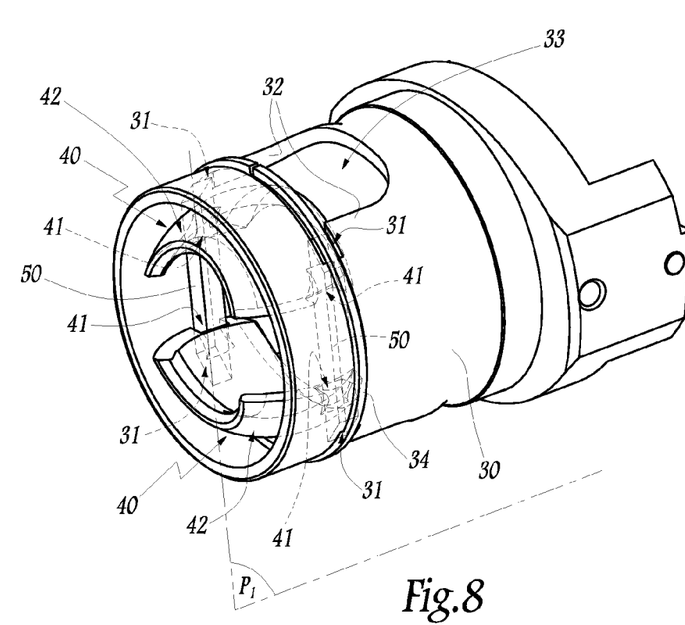
FIG. 8 is a perspective view of two locking members and of their control means, forming part of the female element of the coupling of FIGS. 1 to 7, with the section plane of FIGS. 1 to 5 being marked as $P_1$.

As can be seen more particularly in FIG. 8, the control ring 30 is provided with four notches 31 in which two bars 50 are engaged. The bars 50 are constrained to move with the control ring 30 in rotation and in translation relative to the axis $X_A$-$X'_A$. These bars are themselves engaged in notches 41 formed in the outside surface 42 of each finger 40. More precisely, each bar 50 is engaged in two notches 31 of the control ring 30 and in one notch 41 of each of the two fingers 40.

The notches 31 are formed in two lugs 32 of the control ring 30 that are separated by two openings 33 that serve to pass two projections 21b formed integrally with the body 21. Thus, the control ring 30 is constrained in rotation with the body 21. A spring clip 34 is placed around the lugs 32, axially level with the notches 31 and holds the bars 50 in the notches 31. To clarify the drawing, the spring clip 34 is shown solely in FIG. 8.

Each locking member 40 has a surface 43 forming a portion of a sphere and having a center of curvature that is referenced $C_{40}$. The surface 43 is an inside surface of the member 40 insofar as it faces towards the center of curvature $C_{40}$. This inside surface 43 is extended, beside the mouth 22a of the channel 22 into which the male element B is inserted, by a surface 44 in the form of a sector of a truncated cone that converges going away from the inside surface 43. The half angle at the apex of the surface 44 relative to an axis $X_{40}$-$X'_{40}$ is written α, which axis is an axis of symmetry for the surface envelopes of the simultaneous 42, 43, and 44 and contains the point $C_{40}$. The axis $X_{40}$-$X'_{40}$ coincides with the axis $X_A$-$X'_A$ in the configuration of FIG. 3. The value of the angle α lies in the range 30° to 60°, e.g. being equal to 45°. It is selected as a function of the shape of the male endpiece B.

Reference 45 designates the front edge of a locking member 40 adjacent to its surface 44. Reference 46 designates the fraction of a locking member that is defined by the surface 44 on its inside, i.e. beside the center of curvature $C_{40}$.

The angle at the apex of the angular sector on which the surface 44 extends around the axis $X_A$-$X'_A$ is written β. The value of the angle β lies in the range 90° to 150° and is preferably 120°.

The outside surface 42 of the locking member 40 is likewise a portion of a sphere centered on the point or center of curvature $C_{40}$. This surface is an outside surface insofar as it faces away from the center of curvature $C_{40}$. The radii of the surfaces 42 and 43 are written respectively $R_{42}$ and $R_{43}$. The difference between these radii corresponds to the radial thickness $e_{40}$ of the locking member 40 between the surfaces 42 and 43 defining the outside and inside faces of each locking member.

The surface 43 of a locking member 40 is concave and its surface 42 is convex, with its center of curvature $C_{40}$ being situated outside the member 40 on the concave side of the surface 43.

Figure 6:
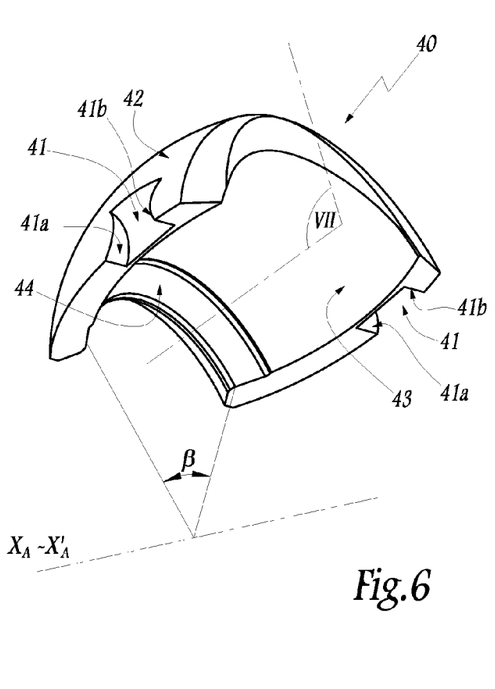
FIG. 6 is a perspective view on a larger scale of a locking member forming part of the female element of the coupling of FIGS. 1 to 5.
Figure 7:
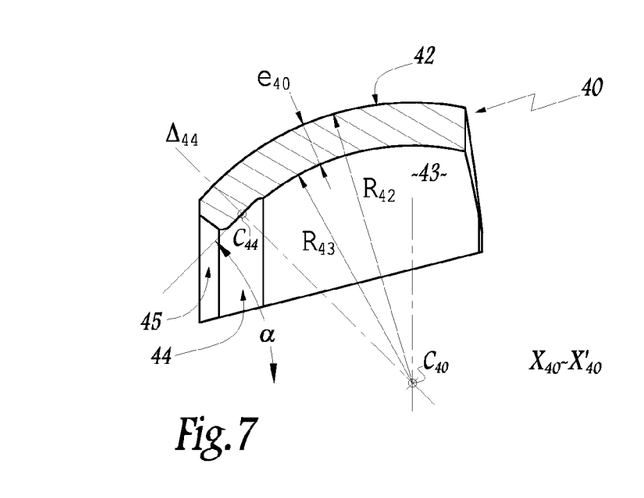
FIG. 7 is a section on plane VII of FIG. 6.

The linkage between the control ring 30 and the two locking members 40 that is obtained by means of the bars 50 is such that movement of the control ring 30 in axial translation parallel to the axis $X_A$-$X'_A$ gives rise to corresponding movement of the locking members 40 in the housings 27, the notches 41 of the locking members 40 being capable of sliding along the bars 50, given their shape with rounded sides 41a and 41b and as can be seen in FIG. 6.

Each housing 27 is defined between a convex inner surface 28 and a concave outer surface 29.

The surface 28 is a portion of a sphere and its center of curvature is written $C_{27}$. When the locking members 40 are in the installed configuration in the housing 27, the centers of curvature of a housing 27 and of a locking member received in the housing, i.e. $C_{27}$ and $C_{40}$, coincide, and they are stationary relative to the body 21. The radius of the inner surface 28 is written $R_{27}$, this radius having a value that is equal, to within 0.1 millimeters (mm), or slightly less than the value of the radius $R_{43}$.

Furthermore, the surface 29 of each housing 27 is also centered on the point or center of curvature $C_{27}$, while being a portion of a sphere, and its radius $R_{29}$ has a value equal, to within 0.1 mm, or slightly less than to the value of the radius $R_{43}$.

The surface 28 is an inner surface in the sense that it defines the housing 27 on its side adjacent to the center of curvature $C_{27}$, while the outer surface 29 is an outer surface in the sense that it defines the housing on its side remote from said center.

Thus, each locking member 40 may be inserted into a housing 27 and guided by the co-operation between the surface 43 and 28 on the inside of said locking member facing towards the center of curvature $C_{40}$, and by co-operation between the surfaces 42 and 29 on the outside of the locking member 40, i.e. on its side facing away from the center of curvature $C_{40}$.

The centers of curvature $C_{40}$ of the two locking members 40 coincide, as to the centers of curvature $C_{27}$ of the two housings 27. These centers of curvature $C_{27}/C_{40}$ lie on the axis $X_A$-$X'_A$, at a fixed position along said axis.

In the assembled configuration of a locking member 40 in the corresponding housing 27, the centers of curvature $C_{27}$ and $C_{40}$ lie along the axis $X_A$-$X'_A$ going away from the mouth 22a of the channel 22 relative to the edge 45. In other words, the centers of curvature $C_{27}$ and $C_{40}$ are located towards the rear of the female element A relative to the surface 44 of a locking member 40.

In a variant of the invention that is not shown, the locking members 40 may be provided with a surface constituting a portion of a sphere on only one of their sides, the inner or the outer side, with the shape of the housing 27 being adapted accordingly.

A straight line passing through the geometrical center $C_{44}$ of the surface 44 perpendicularly to said surface at that point is written $\Delta_{44}$. In the assembled configuration of a locking member 40 in its housing 27, the line $\Delta_{44}$ intersects the axis $X_A$-$X'_A$ at the point $C_{40}$. In other words, the line $\Delta_{44}$ associated with a locking member 40 passes through the center of curvature $C_{40}$ associated with said locking member, and the point of intersection between the line $\Delta_{44}$ and the axis $X_A$-$X'_A$ coincides with the center of curvature of the inside surface 43.

In the assembled configuration of the locking members 40 in the housings 27, the locking members have their respective surfaces 42 centered on the point $C_{40}$ that corresponds to the destination point on which the resultant of the locking forces exerted by each locking member 40 against the frustoconical edge 16b of the groove 16 of the male element B is directed. Given the spherical shape of the surfaces 42, 43, 28, and 29, the movement of the locking members 40 inside the housings 27 takes place in the form of a pivoting movement, in the direction of curved arrow $F_3$ in FIGS. 1 and 5 about an axis Y-Y' that is fixed relative to the body 21, that is perpendicular to the axis $X_A$-$X'_A$, and that passes through the point $C_{40}$. In the example shown, the axis Y-Y' is perpendicular to the plane of FIGS. 1 to 5, since its orientation is determined by co-operation between the bars 50 and the ring 30 which is keyed around the body 21. The axis Y-Y' is perpendicular to the plane containing the axis $X_A$-$X'_A$ and the geometrical centers $C_{44}$ of the surfaces 44 of the two members 40. The axis Y-Y' is perpendicular to the long axes of the bars 50. The axis Y-Y' is stationary relative to the body 21, since it passes through the point $C_{40}$ that is fixed relative to the body and since the orientation of the bars about the axis $X_A$-$X'_A$ is fixed.

This pivoting movement $F_3$ causes the locking members 40 to move in a radial direction relative to the direction X-X' in the plane of FIG. 1 with an amplitude that is smaller than when locking members move in translation. This makes it possible to limit the radial size of the female element A, and consequently of the coupling R.

Figure 3:
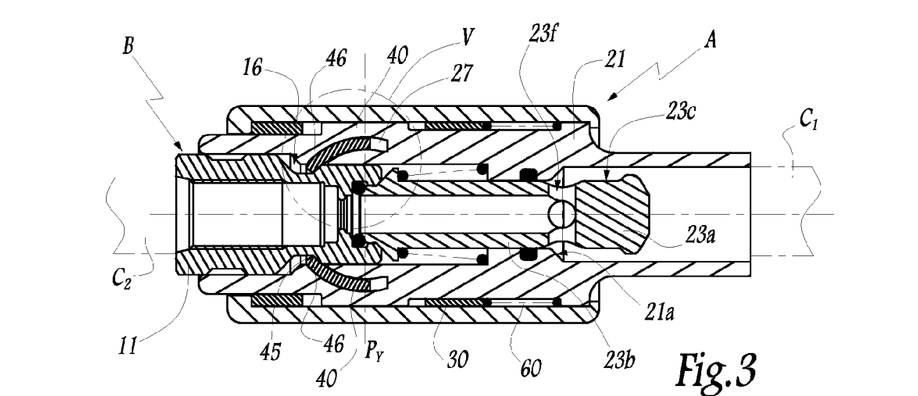
FIG. 3 is a section analogous to FIG. 2, the elements of the coupling being in the coupled-together configuration.

The control ring 30 is subjected to the action of a spring 60 that exerts a resilient force $F_4$ on said ring, tending to move the ring towards the mouth 22a of the channel 22, i.e. to move the locking members 40 towards a configuration in which their fractions 46 project from the housings 27 towards the axis $X_A$-$X'_A$. By default, the locking members 40 are thus pushed away by the spring 60 via the ring 30 towards positions in which their fractions 46 project from the housings 27, as shown in FIG. 3, in such a manner as to enable them to be engaged in the groove 16 of a male element B, when such an element is engaged in the female element A.

An actuation ring 70 is mounted around the body 21 and the control ring 30, and it enables this control ring to be moved towards the rear of the body 21 against the force $F_4$, exerting a force $F_5$ on the control ring 30 suitable for causing it to move rearwards.

The movements of the control ring 30 and of the locking members 40 under the drive of the force $F_4$ exerted by the spring 60 are limited by the fact that the control ring 30 bears against a radial inner collar 71 of the actuation ring 70 that comes into abutment via an inner radial collar 72 against the body 21. This serves to control the positions of the locking members 40 in the absence of a male element, and ensures that they are not expelled from the housings 27 under drive from the spring 60 to such an extent as to impede coupling the elements A and B together.

Figure 2:
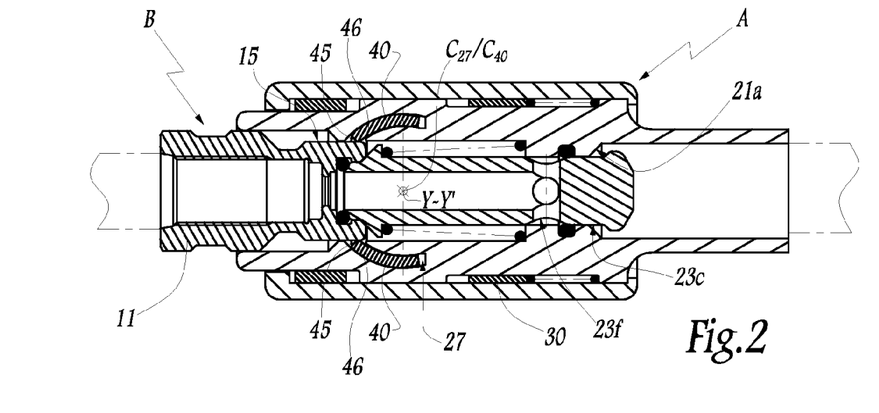
FIG. 2 is a section analogous to FIG. 1, on a smaller scale, with the male and female elements being in the process of being coupled together.

Operation is as follows: when the male element B approaches inside the female element A, the leading edge 17 of the body 11 comes into contact with the edges 45 of the locking members 40, as shown in FIG. 1. If engagement is continued by pushing the element B towards the rear of the body 21, then the body 11 pushes the locking members 40 into the housings 27, as shown in FIG. 2. The edges 45 of the locking members 40 then slide over the radially outside surface 15 of the body 11 while the fractions 46 of the locking members 40 are pushed back into the housings 27.

The movements of the locking members 40 between the configuration of FIG. 1 and the configuration of FIG. 2 takes place by pivoting about the axis Y-Y' that passes through the coinciding points $C_{27}$ and $C_{40}$. This pivoting in the "opening" or "rearwards" direction of the locking members 40 is guided by co-operation between the surfaces 43 and 28. It is also guided by co-operation between the surfaces 42 and 29. This movement of the locking members 40 inside the body 21 also has the effect of pushing back the control ring 30 against the force $F_4$, since the embodiments 30 and 40 are constrained to move in translation along the axis X-X' by the bars 50 that are constrained to move in translation parallel with the axis X-X', both with the locking members 40 and with the control ring 30.

In this configuration as shown in FIG. 2, the male element B pushes back the valve 23, thereby having the effect of beginning to separate the surface 23c from the seat 21a. This coupling movement has no influence on the position of the actuation ring 70, which remains in place around the body 21.

As the coupling movement continues, the groove 16 of the male endpiece B comes into register with the edges 45 of the locking members 40. Since the locking members are subjected to the action of the spring 60 via the control ring 30, the locking members 40 are pushed part of the way out from the housings 27 into the channel 22 so that their fractions 46 engage in the groove 16, thereby bringing them into the coupled configuration shown in FIG. 3.

In this configuration, the valve 23 is pushed back by the body 11 to such an extent that radial orifices 23f in the hollow portion 23b extend beyond the O-ring 24 towards the rear of the body 21. This has the effect of allowing fluid to flow from the pipe $C_1$ towards the pipe $C_2$ through the valve 23.

The half-angle at the apex of the edge 16b of the groove 16 is written γ. In practice, this angle is equal to 45°. By selecting the value of the angle α to be equal to the value of the angle γ, surface-on-surface contact is obtained between the surface 44 of each locking member 40 and the edge 16b of the groove 16, thereby ensuring that the male element B is held reliably in the female element A. The cone-on-cone contact between each locking member 40 and the body 11 is angularly distributed around the axis X-X' over an angular sector equal to the value of the angle β. With the two locking members 40, the cone-on-cone contact is thus distributed over 240° in the example shown.

Any expulsion forces on the male element B resulting from the pressure of the fluid in the channel 22 and the action of the spring 60 are taken up by the body 21 at the contact zone between the surfaces 42 and 29, these surfaces being in surface-on-surface contact over a large area, thereby enabling the forces to be well distributed.

When it is appropriate to uncouple the elements A and B, the operator exerts the above-mentioned force $F_5$ on the actuation ring 70, thereby having the effect of moving the control ring 30 rearwards against the force $F_4$, and consequently of moving the locking members 40 into the housings 27, such that their fractions 46 defined by the frustoconical surfaces 44 are moved out from the groove 16 and release the body 11 of the male element B. The movement of the members 40 into the housings 27 is then guided by co-operation between the surfaces 28 and 43 and also between the surfaces 29 and 42. The male element B is pushed back by the valve 23 which is subjected to the pressure that exists in the upstream pipe $C_1$ and to the force $F_1$ from the spring 26, so the solid portion 23a of the valve comes to rest against the seat 21a, thereby preventing fluid from flowing. The force $F_5$ is maintained by the operator so long as the male element B has not been withdrawn from the female element A.

Figure 4:
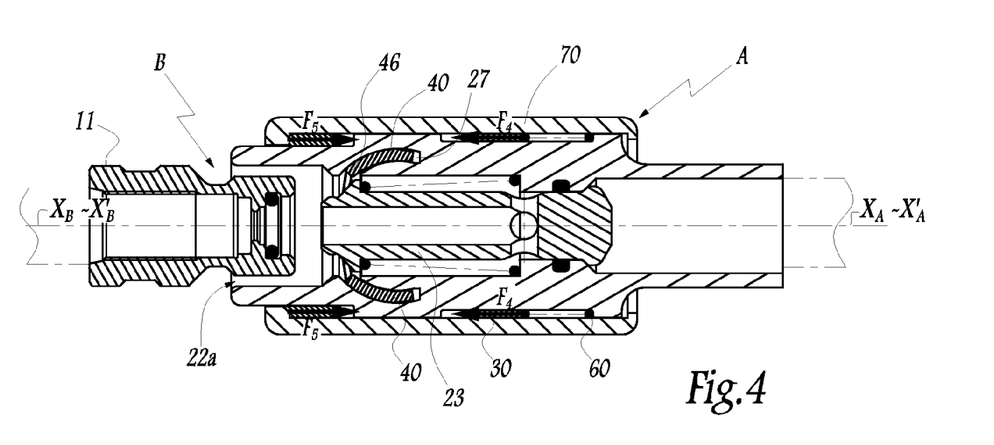
FIG. 4 is a section analogous to FIG. 2, while the coupling elements are in the process of being uncoupled.
Figure 5:
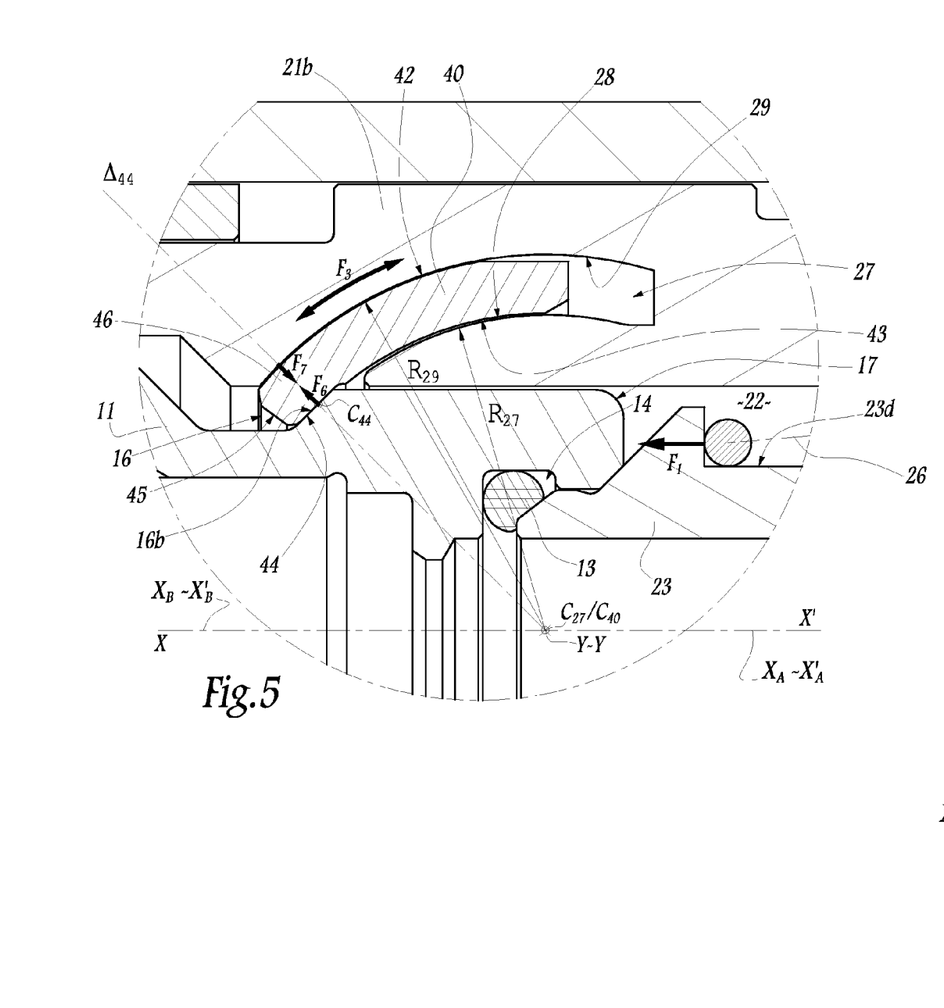
FIG. 5 is a view on a larger scale showing the detail V of FIG. 3.

Thus, the fraction 46 of each locking member 40 is movable between the first position of FIG. 3 in which it is engaged in the groove 16 that it retains in the female element A, and the second position of FIGS. 2 and 4 in which the fraction 46 does not oppose movement of the male element B relative to the female element A in translation along the axis X-X' so as to uncouple the elements A and B.

The shapes of the locking members 40 and of the housings 27 allow the fraction 46 of the locking members 40 to move between the two above-mentioned positions by pivoting about the axis Y-Y', thus avoiding penalizing the radial size of the female element A and of the coupling R. This makes it possible to design locking members 40 that are relatively massive and that come into surface-on-surface contact over a large area both with the body 21 of the female element and with the body 11 of the male element in the coupled-together configuration.

The shape of each locking member 40 is such that its outside surface 42 is centered on the center of curvature $C_{40}$ located on the resultant of the locking forces exerted by the male element B on said locking member via its frustoconical surface 44. This shape enables the male element B and the female element A to avoid exerting any torque on the locking members 40 that would tend to cause them to pivot in an unlocking direction. The resultant $F_6$ of the forces exerted by the edge 16b of the groove 16 on a locking member 40 via the surface 44 passes through the point $C_{44}$ and is perpendicular to the surface 44, so that it extends along the line $\Delta_{44}$ that passes through the center of curvature $C_{27}/C_{40}$. The resultant $F_7$ of the retaining forces exerted by the body 21 of the female element A on each locking member 40 via its outside surface 42 also passes via the center $C_{27}/C_{40}$ and opposes the resultant $F_6$. The resultant $F_7$ is thus likewise directed along the line $\Delta_{44}$.

In all of their positions, the locking members 40 are placed axially along the axis $X_A$-$X'_A$ at the center of curvature $C_{40}$ of the surfaces 42 and 43, i.e. on the axis Y-Y'. In other words, if consideration is given to a plane $P_Y$ perpendicular to the axis $X_A$-$X'_A$ and containing the point $C_{40}$, then this plane intersects a portion of the locking members 40 whatever their position, in particular in the position of FIG. 3 where the fractions 46 project out from the housings 27 to lock the male element B in the female element A. This prevents the locking members 40 jamming.

Figure 9:
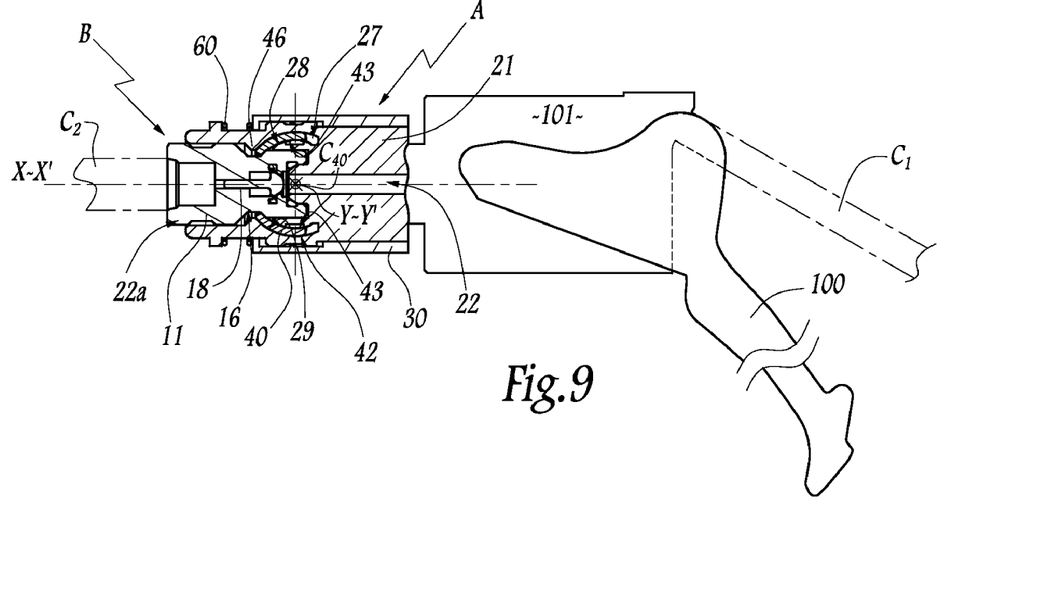
FIG. 9 is a diagram showing the principle of a coupling in accordance with a second embodiment of the invention in which the female element forms part of a pistol, the coupling being shown in a configuration analogous to that of FIG. 3.
Figure 10:
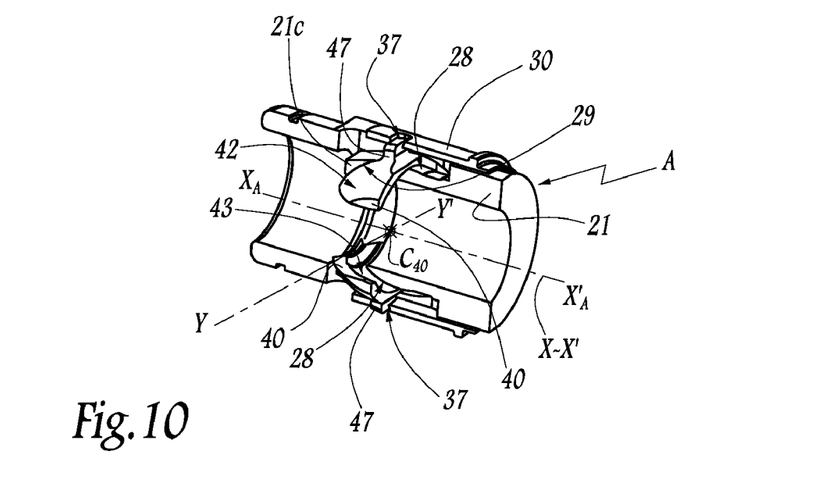
FIG. 10 is a partially cutaway perspective view of a portion of a female coupling element in accordance with a third embodiment of the invention.
Figure 11:
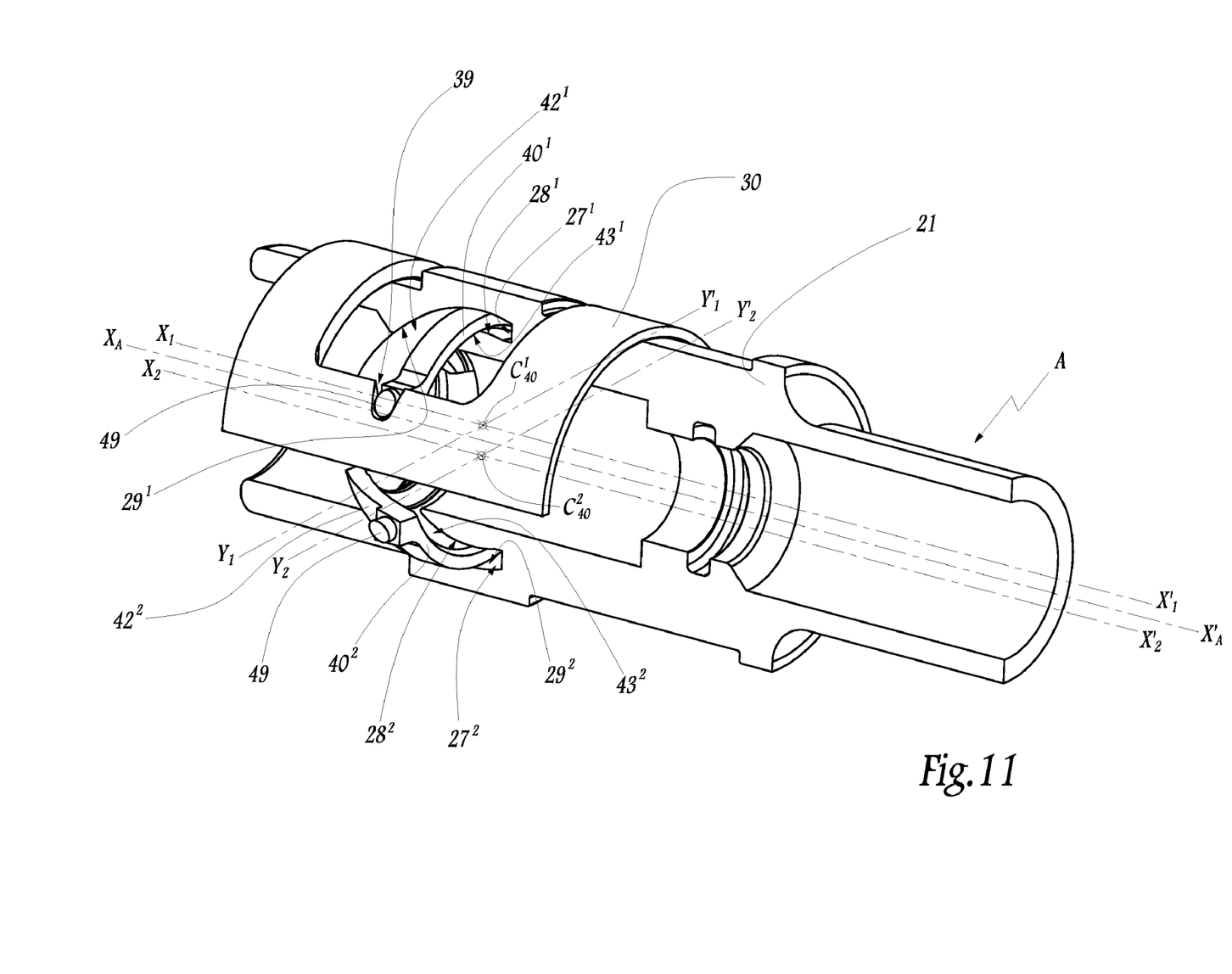
FIG. 11 is a partially cutaway perspective view of a portion of a female coupling element in accordance with a fourth embodiment of the invention.

In the second, third, fourth, and fifth embodiments shown in FIGS. 9 to 11, elements that are analogous to those of the first embodiment are given the same references. These embodiments operate overall like the first embodiment, and below the description relates essentially to the features that distinguish them from the first embodiment.

As can be seen in FIG. 9, it is not necessary to use an actuation ring with the invention. FIG. 9 shows a second coupling R in accordance with the invention that is constituted by a male element B having its body 11 with a shape that is comparable to that of the first embodiment and also including a closure valve 18. The female element is fitted with two locking members 40 presenting substantially the same shape as the locking members 40 of the first embodiment and that are mounted on the body 21 of a pistol A connected to a pipe $C_1$, while the male endpiece B is connected to a pipe $C_2$ containing fluid under pressure. The pistol A is a type of female coupling element that presents the feature of being provided with a trigger 100. The locking members 40 are moved by means of a control ring 30 that is subjected to the action of a spring 60 that exerts a resilient force $F_4$ on the ring. The movements of the control ring 30 against the force $F_4$ are controlled by the trigger 100 that is hinged to an auxiliary body 101 of the pistol A. The connection between the trigger 100 and the control ring 30 is provided by a system of cams and cam-follower wheels that are not shown. Other techniques for controlling the movement of the control ring 30 about the body 21 may be devised within the ambit of the present invention.

In this embodiment, the force $F_4$ exerted by the spring 60 tends, by default, to move the locking members 40 towards the insides of their housings 27, such that these fingers are in a configuration in which they are disengaged from the peripheral groove 16 of the body 11 of the male element B engaged in the female element A. When it is appropriate to lock the body in the female element A, the trigger 100 is actuated to move the control ring 30 against the force $F_4$ towards the mouth 22a of the internal channel 22 of the body 21. This has the result of moving the locking members 40 towards the mouth 22a of the channel 22 of the female element A. This movement of the locking members 40 has the effect of engaging their front fractions 46 in the groove 16 of the male element B so as to lock the male element in the female element A against disconnection.

The default configuration of the locking members 40 in this second embodiment is thus the opposite of the default configuration in the first embodiment where the locking members 40 have a default configuration of engaging in the groove 16 of the body 11 of the male element or in a configuration in which their fractions 46 lie on the path of the body 11 of the male element while it is being engaged.

When it is appropriate to unlock the male element from the female element, the trigger 100 is moved in the direction opposite to the above-described movement, thereby causing the ring 30 to move back away from the mouth 22a. This rearward movement of the ring 30 is assisted by the resilient force exerted by the spring.

Otherwise, the second embodiment operates in a manner that is comparable with that of the first embodiment and each locking member 40 is provided with two surfaces in the form of respective portions 42 and 43 of a sphere that co-operate with the corresponding surfaces 28 and 29 of the body 21 to guide the movement of each of the locking members 40 between the two above-mentioned positions in pivoting about an axis Y-Y' passing through the center of curvature $C_{40}$ of the surfaces 43 and perpendicular to the center longitudinal axis $X_A$-$X'_A$ of the pistol A that coincides with the engagement axis X-X' of the male element B in the female element A.

As shown in FIG. 10, co-operation between the control ring 30 and the locking members 40 of a female coupling element A may be obtained by a central stud 47 formed integrally with each locking member 40 and engaged in a slot 37 in the control ring 30. Two diametrically opposite slots 37 are provided in the control ring 30. In this embodiment, each locking member 40 is guided in its movement between two positions analogous to those described for the first embodiment by co-operation between two surfaces 42 and 43 in the form of portions of a sphere and corresponding surfaces 28 and 29 in the form of portions of a sphere and formed on the body 21 of the female element A. The surface 29 is defined by an auxiliary portion 21c of the body 21. Each locking member 40 is moved by the control ring 30 to pivot about an axis Y-Y' passing through the center of curvature $C_{40}$ of its surface 43 and perpendicular to the longitudinal central axis $X_A$-$X'_A$ of the female element A, this axis coinciding with the engagement axis X-X'.

In the fourth embodiment of the invention shown in FIG. 11, the control ring 30 is provided with notches 39 receiving lateral studs 49 formed integrally with two locking members $40^1$ and $40^2$ that are identical. Each locking member $40^1$ and $40^2$ is provided with two lateral studs 49 that are received in two distinct notches of the control ring 30. The control ring 30 is thus provided with four notches 39, it being specified here that the bottom portion of the control ring 30 is omitted from FIG. 11.

The body 21 of the female element A has two housings $27^1$ and $27^2$ defined by two surfaces $28^1$ and $29^1$ or $28^2$ or $29^2$ that are in the form of portions of a sphere, the surfaces being respectively inner and outer surfaces. The surface $28^1$ in the form of a portion of a sphere of the housing $27^1$ shown in the top portion of FIG. 11 co-operates with an inner surface $43^1$ in the form of a portion of a sphere of the locking member $40^1$, while its surface $29^1$ in the form of a portion of a sphere corresponds with an outer surface $42^1$ in the form of a portion of a sphere of the locking member 40 in order to guide it in its pivoting movements. These pivoting movements take place about an axis $Y_1$-$Y'_1$ passing through the center of curvature $C^1_{40}$ of the inside surface $43^1$ and the outside surface $42^1$ and perpendicular to a longitudinal axis $X_1$-$X'_1$ parallel to the central longitudinal axis $X_A$-$X'_A$ of the female element A and coinciding with the engagement axis X-X' for engaging a male element in the female element A. Similarly, the locking member $40^2$ is provided with outside and inside surfaces $42^2$ and $43^2$ in the form of portions of a sphere, which surfaces are centered on a center of curvature $C^2_{40}$ and co-operate respectively with surfaces $29^2$ and $28^2$ of the housing $27^2$ shown in the bottom portion of FIG. 11. This makes it possible to guide pivoting of the locking member $40^2$ about an axis $Y_2$-$Y'_2$ perpendicular to a longitudinal axis $X_2$-$X'_2$ of the element A and parallel to the axis $X_A$-$X'_A$. The axis $Y_2$-$Y'_2$ passes through the center of curvature $C^2_{40}$ of the surfaces $42^2$ and $43^2$. The points $C^1_{40}$ and $C^2_{40}$ do not coincide and they are symmetrical relative to the axis $X_A$-$X'_A$. The same applies to the axes $Y_1$-$Y'_1$ and $Y_2$-$Y'_2$. As in the first embodiment, the surfaces $28^1$ or $28^2$ and $43^1$ or $43^2$ and also the surfaces $29^1$ or $29^2$ and $42^1$ or $42^2$ serve to guide the movements of a locking member $40^1$ or $40^2$ during coupling of the elements A and B and during uncoupling thereof.

Figure 12:
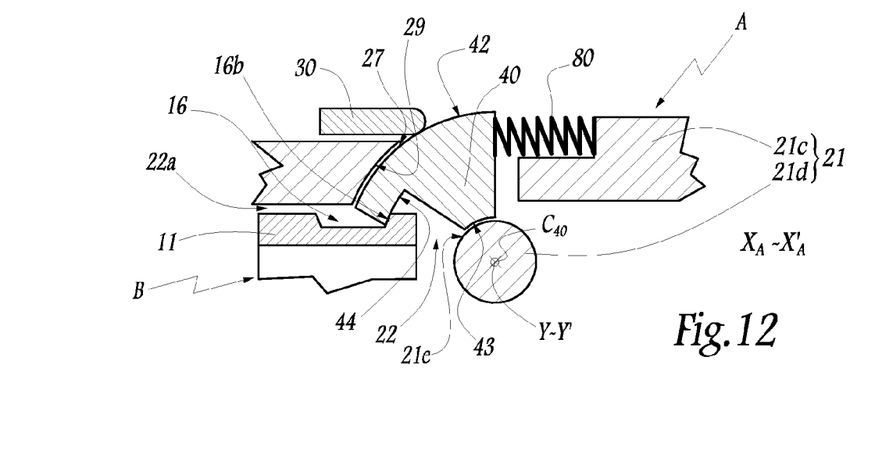
FIG. 12 is a fragmentary section view of a female coupling element in accordance with a fifth embodiment of the invention together with a male element of the same coupling.

In the fifth embodiment of the invention as shown in FIG. 12, the body 21 of the female element A has an annular portion 21c and a spherical portion 21d that is centered on a point that coincides with the center of curvature $C_{40}$ of an outside surface 42 in the form of a portion of a sphere of a locking member 40. The member 40 also has a surface 44 in the form of a sector of a truncated cone for co-operating with an edge 16b of an outer peripheral groove 16 formed in the body 11 of the male coupling element B. The locking member 40 is also provided with an inside surface 43 facing towards the center of curvature $C_{40}$ and that is cylindrical in shape, being of circular section centered on an axis Y-Y' perpendicular to the plane of FIG. 12 and passing through the center $C_{40}$ with a radius of curvature that is adapted to the radius of the portion 21d of the body 21, such that the locking member 40 is guided to pivot relative to the stationary body 21 by co-operation between the inside surface 43 and the outer surface 21e of the portion 21d. The locking member 40 is received in a housing formed by the body 21 and defined by a surface 29 in the form of a portion of a sphere.

Furthermore, the locking member 40 is subjected to the action of a control ring 30 that enables it to be separated from the groove 16 when the male and female elements B and A are being uncoupled. The locking member 40 is also subjected directly to the action of a spring 80 that is interposed between the locking member and the stationary body 21 on the side remote from the mouth 22a of a fluid flow channel 22 formed in the body 21. In other words, the member 40 is subjected to the action of the control ring 30 in order to move it towards the rear of the body 21 of the female element A, and to the action of the spring 80 in order to move it towards the front of the body.

As in the other embodiments, a locking member 40 moves by pivoting about the axis Y-Y', being guided by co-operation between the surfaces 29 and 42 that may be in surface-on-surface contact over a large area.

This embodiment serves to retain the relatively small radial extent of the movement of the locking members 40, comparable to that of the above-described embodiment, while the surfaces that receive forces are dimensioned for surface-on-surface contact of relatively large area. The inside surface 43 of the member 40 serves merely to provide a guidance function, so its contact with the stationary body 21 may be over a smaller area and this area may therefore be cylindrical.

The number of locking members 40 may be other than two. It is possible to use only one locking member. If more than two locking members are used, they are preferably regularly distributed around the central longitudinal axis of the female element.

The angular orientation of the pivot axis Y-Y', $Y_1$-$Y'_1$, or $Y_2$-$Y'_2$ respectively relative to the longitudinal axis $X_A$-$X'_A$, $X_1$-$X'_1$, or $X_2$-$X'_2$ is such that the pivot axis is perpendicular to the plane in which a point of the locking member 40, $40^1$, or $40^2$ slides. This sliding plane is determined by the means for driving and/or guiding the locking members 40 relative to the body 21, in particular the elements 30 and 50 in the first embodiment, the elements 37 and 47 in the third embodiment, the elements 39 and 49 in the fourth embodiment, and the corresponding elements in the other embodiments.

Preferably, the center of curvature $C_{40}$ of the surfaces in the form of portions of a sphere of a locking member is situated radially between its fraction 46 that is capable of projecting from its housing 27, and the axis $X_A$-$X'_A$. Thus, the pivot axis Y-Y', $Y_1$-Y', or $Y_2$-$Y'_2$ passes between the surface 44 of a member 40 and the axis $X_A$-$X'_A$, as described for the fourth embodiment, or it intersects said axis, as described for the other embodiments.

The characteristics of the above-mentioned embodiments and variants may be combined with one another in the ambit of the invention. In particular, the centers of curvature $C_{40}$ of the surfaces in the form of portions of a sphere of the various locking members may be distinct in the embodiments of FIGS. 1 to 10 and 12, as mentioned for the fourth embodiment.

The invention claimed is:

1. A female quick coupling element for releasably joining together pipes of fluid under pressure, the female element being suitable for receiving an endpiece of a male coupling element engaged therein along a longitudinal axis of said female element, the female element being fitted with at least one locking member movable in a housing formed in a body of the female element, between a first position in which a fraction of the locking member projects out from the housing in a configuration in which it can be engaged in a peripheral groove of a male element endpiece engaged in the female element, and a second position in which the fraction of the locking member is disengaged from the groove of a male element endpiece in the female element, while a control ring mounted to slide relative to the body of the female element parallel to a longitudinal axis of the female element is suitable for moving the locking member between its first and second positions, the female element being characterized in that the locking member is provided with at least one surface in the form of a portion of a sphere, and in that the movement of the locking member between its first and second positions takes place by pivoting about an axis that is stationary relative to the body of the female element, passing through the center of curvature of the surface in the form of a portion of a sphere of the locking member and perpendicular to a longitudinal axis of the female element.

2. A female coupling element according to claim 1, wherein the housing is provided with at least one guide surface for guiding the locking member during its movement between its first and second positions, said guide surface being in the form of a portion of a sphere having its center of curvature coinciding with the center of curvature of the surface of the locking member when the locking member is in a configuration mounted in the housing.

3. A female coupling element according to claim 1, wherein the locking member is provided with two concentric surfaces in the form of portions of a sphere.

4. A female coupling element according to claim 1, further comprising return means for applying a resilient return force on the control ring urging the locking member towards one of its first and second positions.

5. A female coupling element according to claim 1, wherein it is fitted with two locking members each movable in a housing formed in the body of the female element, and wherein the two locking members and the two housings are disposed symmetrically on either side of the longitudinal axis.

6. A female coupling element according to claim 1, wherein it is fitted with at least two locking members and wherein the surfaces in the form of a portion of a sphere of all of the locking members have a common center of curvature.

7. A female coupling element according to claim 1, wherein the fraction of the locking member that projects from the housing in the first position of the locking member has a surface in the form of a section of a truncated cone suitable for coming into surface-on-surface contact against a frustoconical edge of a groove of an endpiece of the male element endpiece engaged in the female element.

8. A female coupling element according to claim 7, wherein a straight line passing through the geometrical center of the surface in the form of a truncated cone and perpendicular to said surface passes through the center of curvature of the surface in the form of a portion of a sphere of the locking member.

9. A female coupling element according to claim 7, wherein the surface in the form of a section of a truncated cone extends around the longitudinal axis of the female element over an angular sector having an angle at the apex with a value lying in the range 90° to 150°, and preferably of the order of 120°.

10. A female coupling element according to claim 1, wherein a plane perpendicular to the longitudinal axis of the female element and containing the center of curvature of the surface in the form of a portion of a sphere of a locking member intersects said locking member in its first and second positions.

11. A quick coupling for releasably joining together pipes for fluid under pressure, the coupling comprising male and female elements suitable for engaging one in the other, and wherein the female element is according to claim 1.

* * * * *